(12) United States Patent
Jochem et al.

(10) Patent No.: US 10,067,024 B2
(45) Date of Patent: Sep. 4, 2018

(54) DIFFERENTIAL PRESSURE SENSOR

(71) Applicant: Endress + Hauser GmbH + Co. KG, Maulburg (DE)

(72) Inventors: Bernhard Jochem, Darmstadt (DE); Timo Kober, Dietzenbach (DE); Benjamin Lemke, Berlin (DE); Darina Riemer Woyczehowski, Taunusstein (DE); Rafael Teipen, Berlin (DE); Anh Tuan Tham, Berlin (DE); Roland Werthschutzky, Kleinmachnow (DE)

(73) Assignee: ENDRESS + HAUSER GMBH + CO. KG, Maulburg (DE)

( * ) Notice: Subject to any disclaimer, the term of this patent is extended or adjusted under 35 U.S.C. 154(b) by 111 days.

(21) Appl. No.: 15/038,893

(22) PCT Filed: Nov. 3, 2014

(86) PCT No.: PCT/EP2014/073517
§ 371 (c)(1),
(2) Date: May 24, 2016

(87) PCT Pub. No.: WO2015/082145
PCT Pub. Date: Jun. 11, 2015

(65) Prior Publication Data
US 2017/0167936 A1 Jun. 15, 2017

(30) Foreign Application Priority Data
Dec. 6, 2013 (DE) .......................... 10 2013 113 594

(51) Int. Cl.
*G01L 9/12* (2006.01)
*G01L 13/02* (2006.01)
*G01L 19/06* (2006.01)

(52) U.S. Cl.
CPC ........ *G01L 19/0618* (2013.01); *G01L 13/025* (2013.01)

(58) Field of Classification Search
CPC . G01L 9/12; G01L 13/00; G01L 13/02; G01L 13/025; G01L 19/06; G01L 19/0618
See application file for complete search history.

(56) References Cited

U.S. PATENT DOCUMENTS

| 2,999,386 A | 9/1961 | Wolfe |
| 3,232,114 A * | 2/1966 | Ferran ................... G01L 9/0072 73/718 |

(Continued)

FOREIGN PATENT DOCUMENTS

| CN | 1350636 A | 5/2002 |
| CN | 102243124 A | 11/2011 |

(Continued)

OTHER PUBLICATIONS

German Search Report, German Patent Office, Munich, Germany, dated Jan. 8, 2014.

(Continued)

*Primary Examiner* — Nguyen Ha
(74) *Attorney, Agent, or Firm* — Bacon & Thomas, PLLC

(57) ABSTRACT

A differential pressure sensor comprises a measuring diaphragm made of an electrically conductive material, two electrically insulating mating bodies, and at least one capacitive transducer. The measuring diaphragm is connected to the mating bodies in a pressure-tight manner with the formation of a measuring chamber in each case along a circumferential edge. The mating bodies each have a diaphragm bed which is concave in the center, wherein the mating bodies each have a pressure channel which extends through the mating body into the measuring chamber. The capacitive transducer has at least one mating body electrode which is formed by a metallic coating of the surface of the (Continued)

mating body in the region of the diaphragm bed and with which contact can be made by a metallic coating of the wall of the pressure channel. The mating body electrode is formed by an inner region of the metallic coating, which inner region is annularly enclosed by an outer region of the coating and is separated from the latter by an annular insulation region.

15 Claims, 3 Drawing Sheets

(56) References Cited

U.S. PATENT DOCUMENTS

| | | | |
|---|---|---|---|
| 3,557,621 A | 1/1971 | Ferran | |
| 4,612,812 A | 9/1986 | Broden | |
| 4,996,627 A * | 2/1991 | Zias | G01L 9/0042 |
| | | | 205/656 |
| 5,925,824 A * | 7/1999 | Soma | G01L 9/0075 |
| | | | 73/718 |
| 6,295,875 B1 * | 10/2001 | Frick | G01L 9/0072 |
| | | | 73/718 |
| 8,429,978 B2 | 4/2013 | Klosinski | |
| 2002/0178827 A1 * | 12/2002 | Wang | G01L 9/12 |
| | | | 73/718 |
| 2006/0278007 A1 * | 12/2006 | Harasyn | G01L 9/0072 |
| | | | 73/723 |
| 2011/0239773 A1 | 10/2011 | Klosinski | |
| 2011/0296926 A1 * | 12/2011 | Schulte | G01L 9/0072 |
| | | | 73/718 |
| 2013/0139565 A1 * | 6/2013 | Hedtke | G01L 9/0072 |
| | | | 73/1.57 |
| 2014/0021563 A1 * | 1/2014 | Tham | G01L 9/0073 |
| | | | 257/415 |

FOREIGN PATENT DOCUMENTS

| | | | |
|---|---|---|---|
| DE | 102008033592 A1 | 2/2010 | |
| DE | 102010003145 A1 | 9/2011 | |
| EP | 0074176 A1 * | 3/1983 | G01L 9/0073 |
| GB | 2258050 A | 1/1993 | |

OTHER PUBLICATIONS

International Search Report, EPO, The Netherlands, dated Feb. 17, 2015.
English Translation of the International Preliminary Report on Patentability, WIPO, Geneva, CH, Jun. 16, 2016.

* cited by examiner

DIFFERENTIAL PRESSURE SENSOR

TECHNICAL FIELD

The present invention relates to a differential pressure sensor—in particular, a differential pressure sensor—comprising a measuring diaphragm between two mating bodies and a capacitive transducer for converting a pressure-dependent displacement of the measuring diaphragm into at least one electrical signal, wherein the mating bodies are connected to the measuring diaphragm by the formation of a measuring chamber in each case between the mating body and the measuring diaphragm, and wherein a pressure channel extends through each of the mating bodies, the measuring chambers having to be charged with a first and a second pressure respectively, wherein the displacement of the measuring diaphragm depends on the difference between the first pressure and the second pressure.

BACKGROUND DISCUSSION

The mating bodies also comprise a diaphragm bed, which can support the measuring diaphragm in case of a unilateral overload. Differential pressure sensors with such mating bodies are described, for example, in Published German patent applications DE 10 2009 046 229 A1 and DE 10 2011 084 457 A1, where the mating bodies, in this case, comprise glass. The U.S. Pat. No. 4,833,920 discloses a generic capacitive differential pressure sensor, in which each mating body comprises one mating body electrode, wherein each mating body electrode is prepared by a metallic coating of a surface facing toward the measuring diaphragm, wherein the electrodes are each contacted by a metallic coating of the wall of the pressure channel extending through the base body. In the mentioned US patent, the mating bodies comprise a planar surface, wherein the measuring diaphragm in the rest position comprises two concave surfaces, each of which is facing one of the mating bodies, wherein the measuring diaphragm in its edge region is connected with each of the mating bodies via spacers, whereby defined mechanical conditions result for the measuring diaphragm and the two capacitive transducers.

SUMMARY OF THE INVENTION

However, the design of this pressure sensor is very complex. The object of this invention is, therefore, to find a remedy. The object is achieved according to the invention by the differential pressure sensor according to the invention comprises a measuring diaphragm, a first mating body, a second mating body, and at least one capacitive transducer, wherein the measuring diaphragm comprises an electrically conductive material and is connected to the first mating body and the second mating body in a pressure-tight manner by the formation of a measuring chamber in each case between the first and the second mating body along a circumferential edge, wherein the first mating body and the second mating body comprise an electrically isolating material, wherein each of the mating bodies comprises a diaphragm bed which is concave in the center and which can support the measuring diaphragm in case of a unilateral overload, wherein the mating bodies comprise a first and second pressure channel respectively, which extends from a rear side of the mating bodies facing away from the measuring diaphragm through the mating bodies into the respective measuring chamber, wherein the capacitive transducer comprises at least one mating body electrode, which is formed by a metallic coating on the surface of the mating body facing toward the measuring diaphragm, wherein the mating body electrode can be contacted through a metallic coating of the wall of the pressure channel from the rear side of the mating body, wherein the metallic coating of the surface that is facing the measuring diaphragm comprises an inner region, which forms the mating body electrode, and an outer region, which annularly encloses the inner region and is separated from the inner region by an annular insulation region.

In a further development of the invention, each of the mating bodies comprises a planar edge region, which encloses the diaphragm bed, wherein the diaphragm bed comprises a convex transition region toward the edge region, wherein the outer region of the metallic coating is arranged at least in part in the convex transition region.

In a further development of the invention, the outer region of the coating is electrically conductively connected to the measuring diaphragm. The electrically conductive connection can, for its part, be fixed by fitting the measuring diaphragm between the outer edges of the two outer regions. If a native oxide on a measuring diaphragm made of silicon should, possibly, be an obstacle to a reliable electrical contact through fixing, a feed-through can in each case be led from the rear side of the mating bodies to the diaphragm bed, which ends at the outer region of the metallic coating in the diaphragm bed in order to contact the outer region of the metallic coating there. Via this feed-through, the outer region of the coating can then be brought into galvanic contact with the measuring diaphragm—if necessary, via an additional feed-through that extends to the edge of the measuring diaphragm.

In a further development of the invention, the insulation region has a width of no more than 200 µm—in particular, no more than 150 µm, preferably no more than 100 µm, and particularly preferably no more than 80 µm.

In a further development of the invention, the inner region of the metallic coating has a greater layer thickness than the outer region of the metallic coating, wherein the outer layer in particular has a thickness that is no less than 1.5 times—preferably, no less than double—the layer thickness of the inner region of the metallic coating.

In a further development of the invention, the layer thickness of the inner region of the metallic coating is at least 150 nm—preferably, at least 200 nm.

In a further development of the invention, the metallic coating comprises at least one metallic adhesion promoter—in particular, chromium—and one metallic conductive layer—in particular, copper.

In a further development of the invention, the inner region of the metallic coating comprises an additional passivation layer, which comprises nickel in particular, wherein the outer region of the metallic coating is terminated by the metallic conductive layer.

In a further development of the invention, the mating bodies comprise glass.

In a further development of the invention, the measuring diaphragm is fixed between the outer region of the metallic coating of the first mating body and the outer region of the metallic coating of the second mating body.

The method according to the invention for preparing a mating body for a capacitive differential pressure sensor—in particular, for a differential pressure sensor according to the invention—wherein the mating body comprises an electrically insulating material—in particular, glass—wherein the mating body comprises a diaphragm bed which is concave in the center and which is lowered with respect to a planar edge region of the mating body, wherein a pressure channel extends from a rear side of the mating body through the mating body and ends in the area of the diaphragm bed, comprises the following steps:

Preparing a first metallic partial coating, which comprises an inner region, an outer region, and a through-connection, wherein the inner region covers a central region of the diaphragm bed, wherein the outer region annularly encloses the inner region and is separated from the inner region by an annular insulation region which runs between the inner region and the outer region, wherein the through-connection is arranged on one wall of the pressure channel and comprises an electrically conductive connection to the inner region, and Preparing a second metallic partial coating, which covers the through-connection and the inner region and leaves the outer region and the insulation region uncovered.

In a further development of the invention, the preparation of the first partial coating comprises a sputter process for depositing a metal.

In a further development of the invention, a lift-off lacquer is deposited in the area of the insulation region prior to preparing the first partial coating, wherein the first partial coating of the inner region and of the outer region is prepared initially in a continuous manner, and wherein the insulation region is formed prior to preparing the second partial coating by means of a lift-off process, in which the lift-off lacquer and the metal deposited on it are removed.

In a further development of the invention, the preparation of the second partial coating comprises a galvanic process.

In a further development of the invention, the first partial coating comprises copper, while the second partial coating comprises nickel, wherein the nucleation of nickel on the first partial coating is initiated by a metal contact—in particular, a temporary metal contact—between the first partial coating and a less noble metal than nickel, wherein the less noble metal comprises, in particular, iron or aluminum.

In a further development of the invention, the first partial coating also comprises a metallic contact surface that is arranged on a rear side of the mating bodies facing away from the inner region, wherein the contact surface is in galvanic contact with the inner region via the through-connection.

In a further development of the invention, a plurality of mating bodies is prepared in a wafer arrangement. For this purpose, the first partial coating also initially comprises, according to this further development, a conductor path arrangement, which must be removed later, if necessary, and with which the contact surfaces of the mating bodies are connected with each other, wherein the generation of a temporary metallic contact between the metal which is less noble than nickel and the first partial coating takes place in the area of the conductor path arrangement on the rear side of the wafer arrangement, in order to thereby initiate the nucleation of nickel when preparing the second partial coating.

The contact between the less noble metal and the first partial coating in the area of the conductor path arrangement allows for a synchronous initiation of the nucleation of nickel for all mating bodies. Thus, for all mating bodies, an essentially equal layer thickness of the nickel layer, which forms the second partial coating, is achieved during the same process time.

BRIEF DESCRIPTION OF THE DRAWINGS

The invention is explained in the following in further detail on the basis of the exemplary embodiments shown in the figures. Illustrated are.

DETAILED DISCUSSION IN CONJUNCTION WITH THE DRAWINGS

Figure 1:
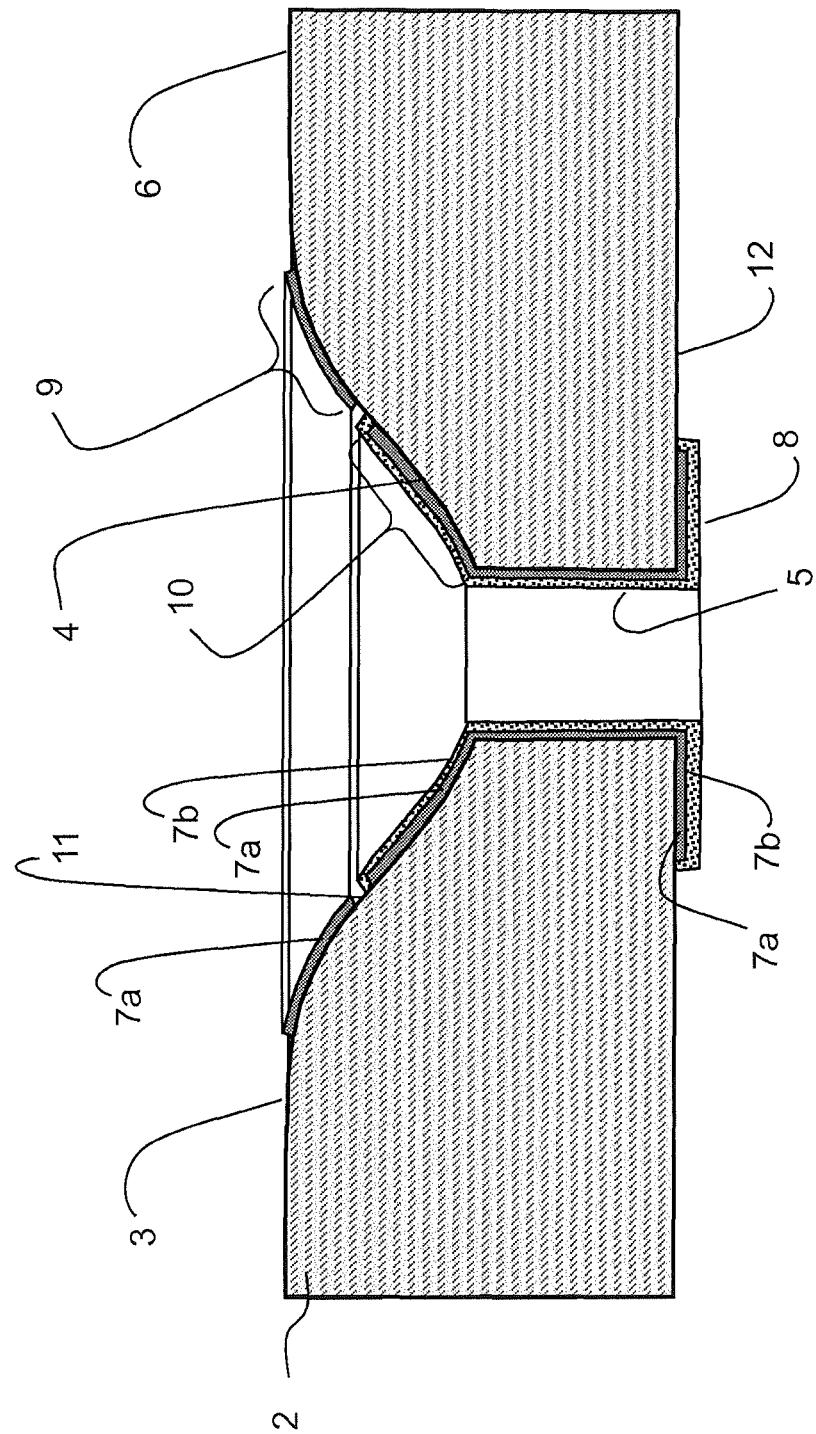
FIG. 1: is a longitudinal section through a mating body of a differential pressure sensor according to the invention.

The mating body 2 illustrated in FIG. 1 comprises glass, wherein a front surface 3 of the mating body 2 comprises a concave diaphragm bed 4, which is formed, for example, by thermal sinking of the base body. The depth of the diaphragm bed may, for example, be from 10 μm to 20 μm, for a diameter of 2 to 4 mm. The thickness of the mating body may be from several hundred μm to several thousand. From the diaphragm bed 4, a pressure channel 5 extends to the rear side of the mating body. The diaphragm bed 4 is enclosed by a planar edge region 6. The mating body comprises a metallic coating 7, which extends from a convex transition region between the diaphragm bed 4 and the edge region via the diaphragm bed and through the pressure channel 5 to a contact surface 8 on the rear side of the mating body 2. The coating comprises a first partial coating 7a, which comprises the entire area of the coating, wherein, between an outer region 9 of the coating and an inner region 10 of the coating, an insulation region 11 is arranged, which is not covered with a metallic coating. The first partial coating is prepared by sputtering of an adhesion promoter, such as chromium, with a thickness of about 20 nm and subsequent sputtering of copper with a thickness of 80-100 nm, wherein the insulation region 11 is formed by a lift-off process, by means of which the coating between the outer region in the inner region has been removed.

The metallic coating 7 also comprises a second partial coating 7b, which extends from the inner region 10 via the pressure channel to the contact surface 8 on the rear side 12 of the mating body 2. The second partial coating comprises nickel with a thickness of about 100 nm. The second partial coating has, in particular, been deposited during a galvanic process, which is explained in detail below.

Figure 2:
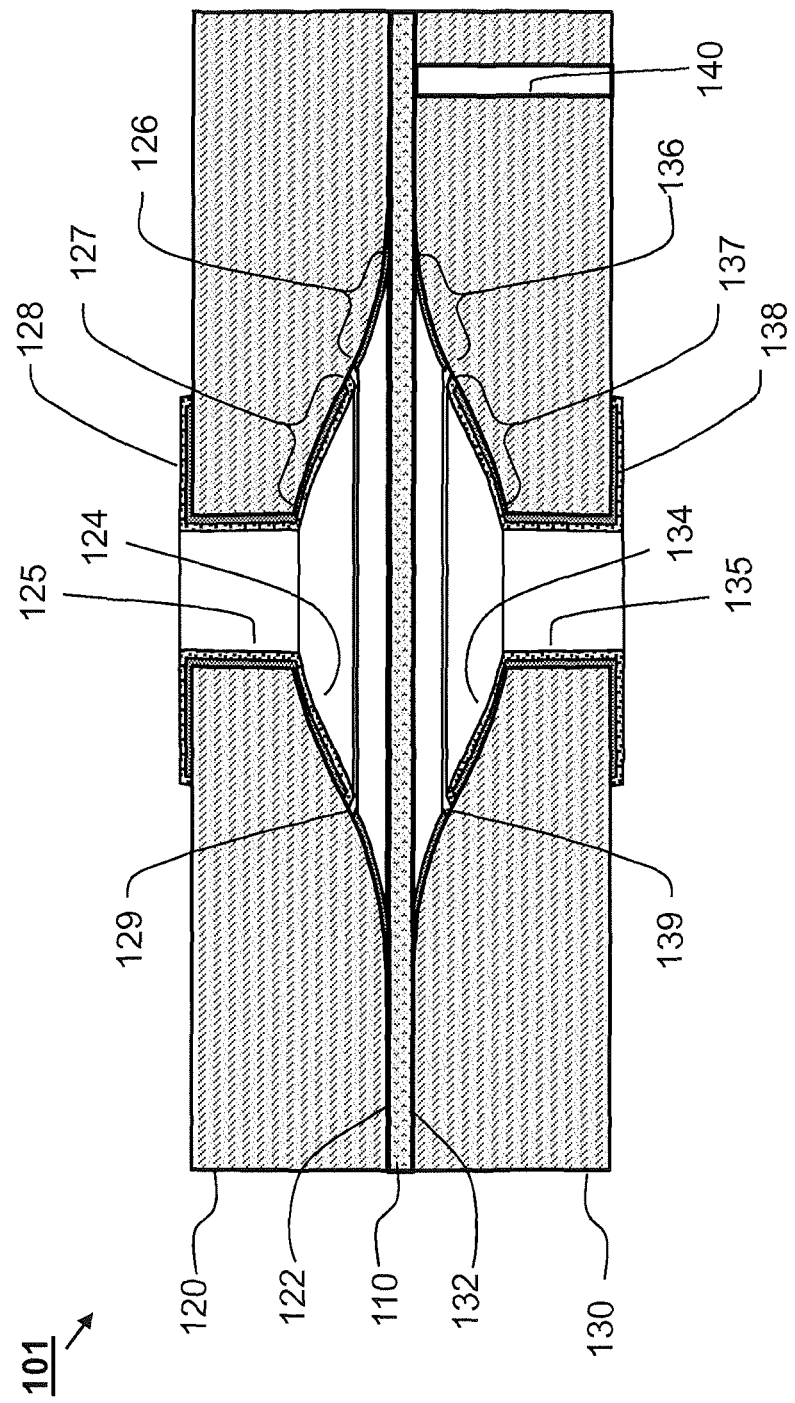
FIG. 2: is a longitudinal section through an exemplary embodiment of a differential pressure sensor according to the invention.

FIG. 2 shows an exemplary embodiment of a differential pressure sensor 101 according to the invention, which comprises a measuring diaphragm 110 between a first mating body 120 and a second mating body 130, each of the two mating bodies 120, 130 having the structure of the exemplary embodiment of a mating body discussed in connection with FIG. 1. The first mating body, in particular, comprises a first diaphragm bed 124, from which a pressure channel 125 extends to the rear side of the first mating body 120. Likewise, the second mating body comprises a second diaphragm bed 134, from which a second pressure channel 135 extends to the rear side of the second mating body. The first mating body and the second mating body each comprise a metallic coating, which comprises an outer region 126, 136, which is arranged respectively in a transition zone between the diaphragm bed and a planar edge region enclosing the diaphragm bed; the metallic coating also comprises an inner region 127, 137, which is separated from the outer region by an insulation region 129, 139 respectively. The metallic coating also extends respectively from the inner region via the wall of the pressure channel 125, 135 to the rear side of the mating body in order to form a contact surface 128, 138 there. In the outer region 126, 136, the metal coating comprises an adhesion promoter—20 nm chromium, for example—and a copper layer with a thickness of about 80-100 nm, which is deposited onto the previously deposited chromium. The remaining part of the metallic coating, which respectively comprises the inner region 127, 137, the wall of the pressure channel 125, 135, and the contact surface 128, 138 on the rear side of the mating body, also comprises a nickel layer with a thickness of, for example, 100-150 nm, which is deposited galvanically on the copper layer. The outer region is not covered by the nickel layer.

The measuring diaphragm 110 comprises particularly highly doped silicon and is joined to both the first mating body 120 and the second mating body 130 along a circumferential joint by anodic bonding in each case. Here, the joints extend respectively to the outer edge of the outer region 126, 136. Since the outer region 126, 136 respectively extends into the planar edge region of the surface of the mating body, the joint defined in the planar region is in this way limited, so that the measuring diaphragm 110 comprises a defined mechanical fixing between the mating bodies 120, 130. The measuring diaphragm 110 can be charged through the first pressure channel 125 and the second pressure channel 135 with a first and second pressure respectively, wherein the first pressure counteracts the second pressure, and the measuring diaphragm can be displaced depending on the difference between the first pressure and the second pressure. The inner region 127 of the first metallic coating of the first mating body 120 forms, together with the measuring diaphragm 110, a first capacitive transducer for capturing a displacement of the measuring diaphragm 110. Likewise, the inner region 137 of the second metallic coating of the second mating body 130 forms, together with the measuring diaphragm 110, a second capacitive transducer for capturing a displacement of the measuring diaphragm 110. The first capacitive transducer and the second capacitive transducer can be activated together as a differential capacitor in order to determine the difference between the first pressure and the second pressure.

The inner regions of the metal coatings, which form the first and second electrode of the first and second capacitive transducer respectively, can be contacted via the contact surfaces 128, 138 on the rear side of the first and second mating body respectively. In order to be able to contact the measuring diaphragm 110, a first bore 140 is provided, which extends from the rear side of a mating body to the measuring diaphragm 110.

Figure 3:
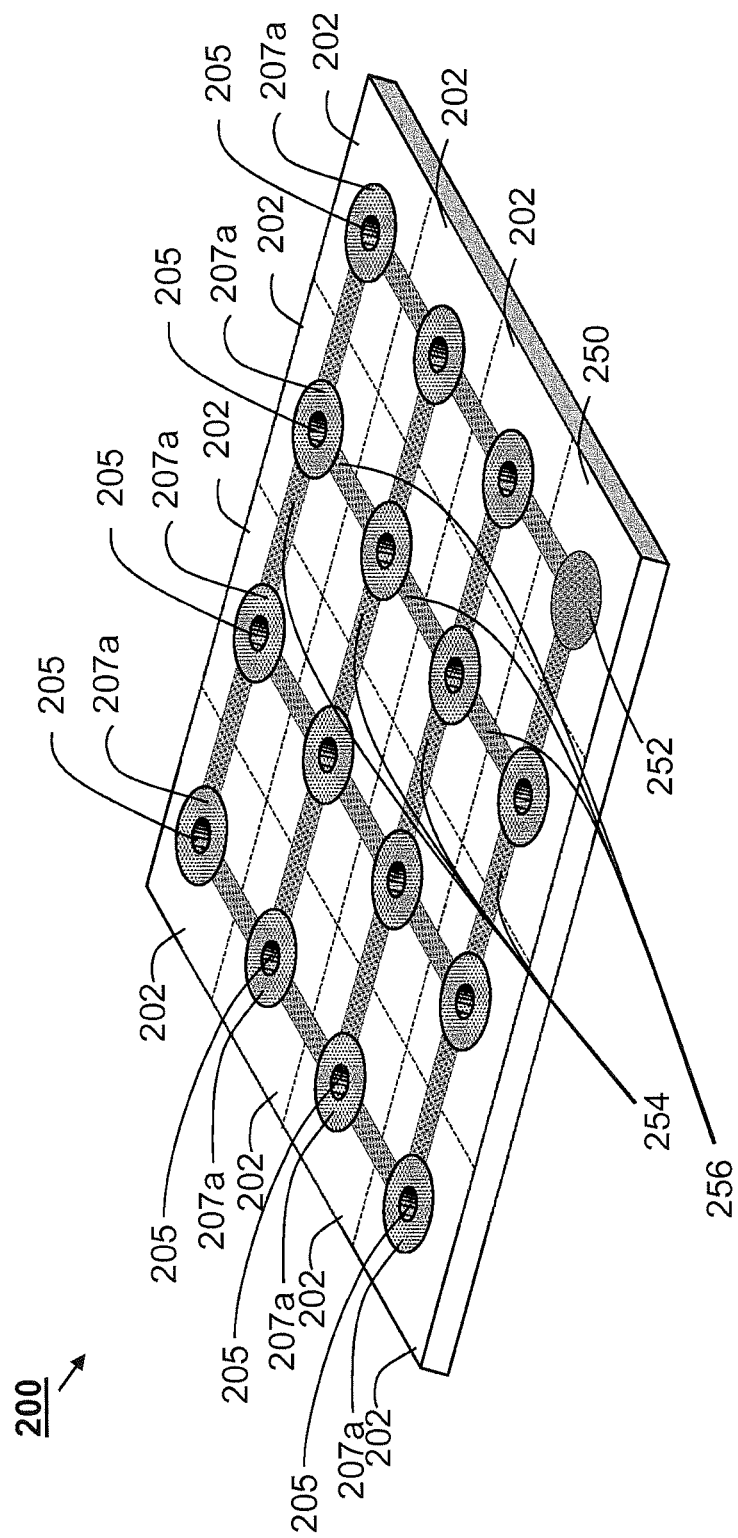
FIG. 3: is a spatial representation of the rear side of a wafer with mating bodies.

The glass wafer 200 shown in FIG. 3 comprises a plurality of mating bodies 202, wherein the glass wafer 200 is illustrated with the rear side of the mating body 202 facing upwards. Each mating body already comprises on its rear side a first metal partial coating 207a as a metallic partial coating of a wall of a pressure channel 205, which extends from the rear side of the mating body 202 to its front side. The metallic partial coating is prepared by sputtering of chromium as an adhesion promoter with a thickness of about 20 nm and by subsequent sputtering of copper with a thickness of about 80-100 nm. The metallic partial coating 207a is respectively in galvanic contact with an inner region of the metallic partial coating on the front side of the mating body 202 via the metallic partial coating of the wall of the pressure channel.

As discussed above, the first metallic partial coating must still be provided with a second metallic partial coating in order to protect the first metallic partial coating. For this purpose, a galvanic process is provided, in which nickel is deposited onto the copper of the first metallic partial coating.

One difficulty for this process consists in the fact that the nucleation of nickel on copper does not occur spontaneously. It is therefore necessary to bring the copper into metallic contact with a less noble metal than nickel, such as iron, in order to initiate the nucleation of nickel on copper. In order to synchronize this initiation, the partial coatings 207a of the mating bodies 202 are linked to each other via a network of conductor paths 254, 256, wherein the network also comprises a contact surface 252, which is intended to be contacted by an iron body in order to initiate the nucleation of the nickel on copper. If the conductor paths 254, 256 and the contact surface 252 of the network are to be removed again after preparing the second metallic partial coating made of nickel, the surface areas of the glass wafer 200, on which the conductor paths and the contact surface 252 are to be prepared, can be coated in advance with an acid-resistant lift-off lacquer, before the structures of the first metallic partial coating 207a on the rear side of the mating bodies and on the wall of the pressure channels, as well as the conductor paths 254, 256 and the contact surface 252, are deposited on the rear side of the glass wafer 200 by sputtering of chromium and copper. The coating with nickel can take place by means of a galvanic process, which is available commercially from the company Surtec, for example.

After depositing the nickel—and, if necessary, removing the contact surface 252 as well as the conductor paths 254, 256—the mating bodies 202, along the cutting lines shown in the drawing as dashed lines, can be separated, whereby a wafer segment 250, on which the contact surface 252 was prepared, is to be discarded.

The mating bodies 202 prepared in this way correspond to the exemplary embodiment discussed by reference to FIG. 1 and are available for the production of the differential pressure sensors according to the invention.

The invention claimed is:
1. A differential pressure sensor, comprising:
a measuring diaphragm;
a first mating body;
a second mating body; and
at least one capacitive transducer, wherein:
said measuring diaphragm comprises an electrically conductive material and is connected to said first mating body and said second mating body in a pressure-tight manner by the formation of a measuring chamber between said first and said second mating bodies, along a circumferential edge;
said first mating body and said second mating body comprise an electrically insulating material;
the mating bodies each comprise a diaphragm bed which is concave in the center and which can support said measuring diaphragm in case of a unilateral overload;
the mating bodies comprise a first and a second pressure channels, which extend from a rear side of the mating bodies facing away from said measuring diaphragm through the mating bodies into the respective measuring chamber;
said capacitive transducer comprises at least one mating body electrode, which is formed by a metallic coating on the surface of the mating body facing toward said measuring diaphragm;
said mating body electrode can be contacted from the rear side of the mating body by means of a metallic coating of the wall of the pressure chamber;
said metallic coating of the surface, which faces the measuring diaphragm, comprises an inner region, which forms the mating body electrode, and an outer region which annularly encloses said inner region and is separated from said inner region by an annular insulation region; and said outer region of said coating is electrically conductively connected to said measuring diaphragm.

2. The differential pressure sensor according to claim 1, wherein:

each of said mating bodies comprises a planar edge region, which encloses said diaphragm bed;

said diaphragm bed comprises a convex transition region towards the edge region; and said outer region of said metal coating is arranged at least in part in said convex transition region.

3. The differential pressure sensor according to claim 1, wherein:

said insulation region has a width of no more than 200 μm—in particular, no more than 150 μm, preferably no more than 100 μm, and particularly preferably no more than 80 μm.

4. The differential pressure sensor according to claim 1, wherein:

said inner region of said metallic coating has a larger layer thickness than said outer region of said metallic coating; and said inner region in particular has a thickness that is no less than 1.5 times—preferably, no less than double—the layer thickness of the outer region of the metallic coating.

5. The differential pressure sensor according to claim 1, wherein:

the layer thickness of said inner region of said metal coating is at least 150 nm—preferably, at least 200 nm.

6. The differential pressure sensor according to claim 1, wherein:

said mating bodies comprise glass.

7. The differential pressure sensor according to claim 1, wherein:

said measuring diaphragm is fixed between said outer region of said metallic coating of said first mating body and said outer region of said metallic coating of said second mating body.

8. A differential pressure sensor comprising:

a measuring diaphragm; a first mating body; a second mating body; and at least one capacitive transducer, wherein:

said measuring diaphragm comprises an electrically conductive material and is connected to said first mating body and said second mating body in a pressure-tight manner by the formation of a measuring chamber between said first and said second mating bodies, along a circumferential edge;

said first mating body and said second mating body comprise an electrically insulating material;

the mating bodies each comprise a diaphragm bed which is concave in the center and which can support said measuring diaphragm in case of a unilateral overload;

the mating bodies comprise a first and a second pressure channels, which extend from a rear side of the mating bodies facing away from said measuring diaphragm through the mating bodies into the respective measuring chamber;

said capacitive transducer comprises at least one mating body electrode, which is formed by a metallic coating on the surface of the mating body facing toward said measuring diaphragm; said mating body electrode can be contacted from the rear side of the mating body by means of a metallic coating of the wall of the pressure chamber;

said metallic coating of the surface, which faces the measuring diaphragm, comprises an inner region, which forms the mating body electrode, and an outer region which annularly encloses said inner region and is separated from said inner region by an annular insulation region; and said metallic coating comprises at least one metallic adhesion promoter—in particular, chromium—and one metal conductive layer—in particular, copper.

9. The differential pressure sensor according to claim 8, wherein:

said inner region of said metallic coating comprises an additional passivation layer, which comprises nickel, in particular; and said outer region of said metallic coating is terminated by said metallic conductive layer.

10. A method for preparing a mating body for a capacitive differential pressure sensor, wherein the mating body comprises: an electrically insulating material, such as glass, wherein the mating body comprises a diaphragm bed which is concave in the center and which is lowered with respect to a planar region of the mating body, and wherein a pressure channel extends from a rear side of the mating body through the mating body and ends in the area of the diaphragm bed, the method comprises the following steps:

preparing a first metallic partial coating, which comprises an inner region, an outer region, and a through-connection, wherein the inner region covers a central region of the diaphragm bed, the outer region annularly encloses the inner region and is separated from the inner region by an annular insulation region which runs between the inner region and the outer region, and the through-connection is arranged on one wall of the pressure channel and comprises an electrically conductive connection to the inner region; and preparing a second metallic partial coating, which covers the through-connection and the inner region and leaves the outer region and the insulation region uncovered.

11. The method according to claim 10, wherein:

said preparation of the first partial coating comprises a sputtering process, wherein the first partial coating in particular comprises initially an adhesion promoter layer, which contains chromium, and a conductive layer, which contains copper.

12. The method according to claim 10, wherein:

a lift-off lacquer is deposited in the area of the insulation region prior to preparing said first partial coating;

the first partial coating of the inner region and the outer region is prepared initially in a continuous manner; and the insulation region is formed prior to preparing the second partial coating by means of a lift-off process, in which the lift-off lacquer and the metal deposited on it are removed.

13. The method according to claim 10, wherein:

said preparation of the second partial coating comprises a galvanic process.

14. The method according to claim 13, wherein:

the first partial coating comprises copper, the second partial coating comprises nickel, nucleation of nickel on the first partial coating is initiated by a metallic contact, in particular, a temporary metallic contact—between the first partial coating and a metal which is less noble than nickel;

the less noble metal comprises, in particular, iron or aluminum.

15. The method according to claim 13, wherein:

a plurality of mating bodies is prepared in a wafer arrangement;

the first partial coating also comprises metallic contact surfaces in a wafer arrangement on a rear side of the mating body facing away from the inner regions;

the contact surfaces are in galvanic contact with the inner regions via the through-connections;

the first partial coating also comprises a conductor path arrangement, which is to be removed subsequently if need be and with which the contact surfaces are connected to each other; and nucleation of nickel is initiated during the preparation of the second partial coating by generating a metal contact between the metal which is less noble than nickel and the first partial coating in the area of the conductor path arrangement on the rear side of the wafer arrangement.

* * * * *